April 29, 1952    J. BAILEY    2,594,842
METHOD AND APPARATUS FOR PRODUCING PLASTIC TUBING
Filed Feb. 6, 1948
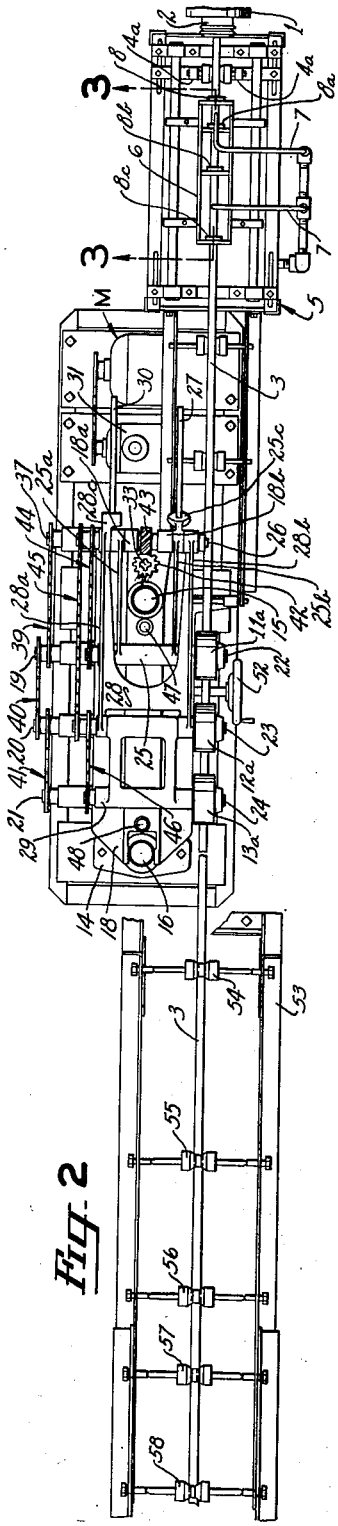
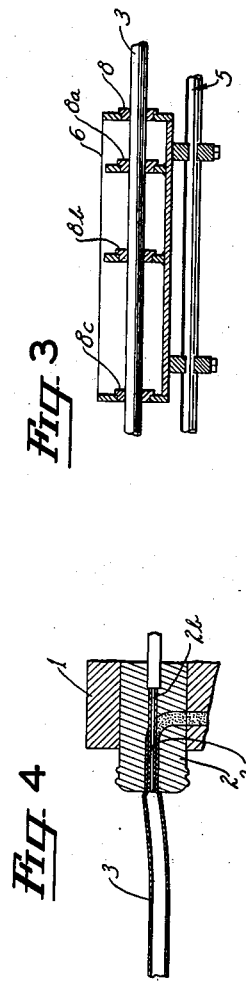
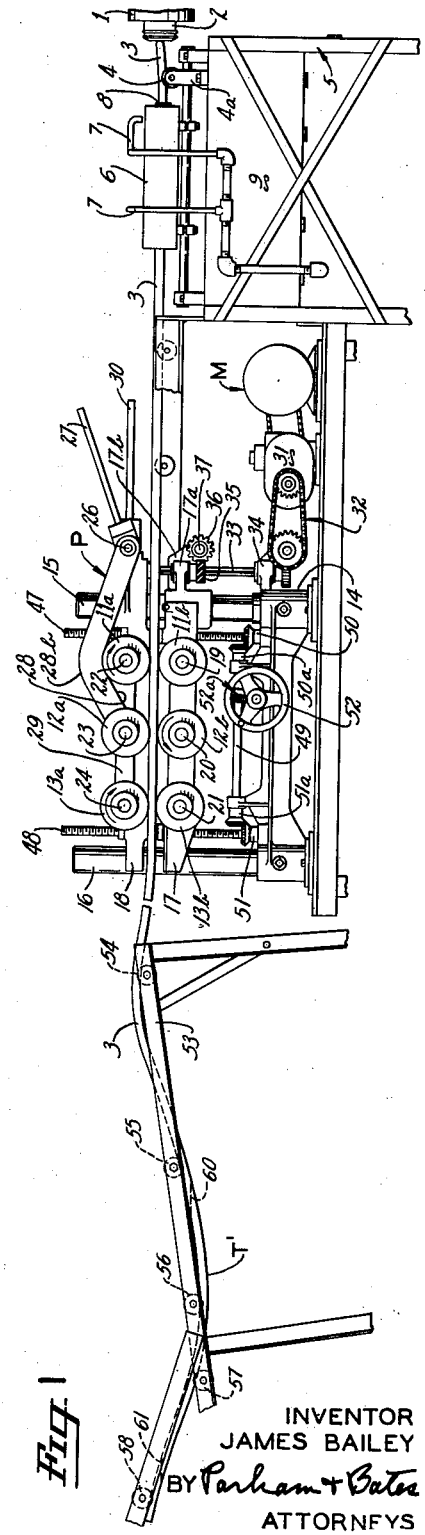
INVENTOR
JAMES BAILEY
BY Parham + Bates
ATTORNEYS Patented Apr. 29, 1952

2,594,842

UNITED STATES PATENT OFFICE 2,594,842

METHOD AND APPARATUS FOR PRODUCING PLASTIC TUBING

James Bailey, West Hartford, Conn., assignor to Plax Corporation, Hartford, Conn., a corporation of Delaware Application February 6, 1948, Serial No. 6,648

4 Claims. (Cl. 18—14)

1

The present invention relates to the manufacture of tubing and more particularly, to novel method and apparatus for producing tubing of uniform size and shape by the extrusion of thermoplastic materials, such as polystyrene and polyethylene.

At temperatures above their softening or transition temperature points, these materials are readily deformable and may be extruded in desired shapes and forms. Cooling establishes or sets these materials in the shapes which they had in passing through their transition points. So long as an article thus formed of one of these thermoplastic materials is not thereafter subjected to the transition temperature of the material, its configuration may be altered by applied stresses within fracture or failure limits for the material and it will return to its established shape when the distorting stresses are removed.

In the extrusion of thermoplastic tubing, considerable difficulty has been experienced where the wall of the extruded tube is insufficient in thickness at the necessarily high extrusion temperatures to prevent collapse during the course of manufacture. In order to overcome the tendency to collapse, it has been found desirable to maintain the interior of the extruded tube under pressure, as by means of a fluid medium such as air, until the thermoplastic tube has been reduced sufficiently below its extrusion temperature to attain the shape-retaining rigidity or strength inherent in such materials at lower temperatures.

Various attempts have been made to solve the problem of blocking or damming the bore of the tube so as to maintain the fluid medium introduced into the tube under a desired pressure. The problem is complicated in those instances where it is desirable to continuously extrude an unlimited length of tube.

One solution to the problem is disclosed in U. S. Patent No. 2,377,908, granted June 12, 1945, to C. E. Slaughter wherein a dam or block is achieved by a plug in the form of an anchored ball over which the tube is continually drawn or pulley. The ball is anchored to a magnetizable core floated centrally within the tube by means of an annular solenoid surrounding the tube. Alternatively, the pressure block might be anchored at a desired point by a strand secured to the bore-shaping portion of the tube-extruding nozzle. The anchored ball serves to size the internal diameter of the tube and to provide the necessary pressure block.

2

The above mentioned patent also discloses an alternative plug in the form of a brush which yields to and does not alter slight variations in the internal contour or bore of the tube as extruded.

These and other known practices have various disadvantages including unreliability of the seal tendency to mar or deform the bore, excessive scrap or waste, and difficulties in establishing and maintaining proper operation.

An object of the present invention is to dam or close the bore of the extruded tube with a leakproof seal for the fluid medium introduced into the tube without effecting a marring or deforming pressure on the internal bore and, at the same time, avoiding the difficulties and disadvantages of previously known practices.

A further object of the invention is to produce a dam that may be readily introduced into the tube and retained at a desired location relative to the extrusion nozzle while the tube is continuously extruded thereover.

A further object is to provide tube-forming apparatus including bore sealing means which is readily set up and operated.

Other objects and advantages of the present invention, in addition to those heretofore described, will be apparent from the following detailed description of one embodiment of the invention, it being understood that the embodiment is illustrative rather than definitive of the invention, and that various changes may be made therein without departing from the scope of the invention.

In connection with the more detailed description there is provided an accompanying drawing wherein:

Fig. 1 is a side elevation view of apparatus for manufacturing tubing in accordance with the present invention;

Fig. 2 is a plan view of the apparatus illustrated in Fig. 1;

Fig. 3 is an enlarged cross-sectional view taken along line 3—3 of Fig. 2 showing details of a liquid cooled sizing die assembly; and Fig. 4 is an enlarged cross-sectional view of the extrusion nozzle shown in Figs. 1 and 2.

Referring to the embodiment of the invention illustrated in the drawings, there is shown the outlet end 1 of an extruder to which is attached a tubing die or nozzle 2 through which plastic material, such as, for example polystyrene, may be extruded in the form of tubing 3.

The optimum temperature at which the tubing is extruded will vary depending upon the thermoplastic material employed. For polystyrene, which has a transition or softening temperature of 180° F., good results may be obtained by extruding at a temperature of approximately 450° F. Following extrusion, the tube is cooled slowly by exposure to air at room temperature, and remains in a plastic condition until the transition temperature is reached. It will be understood that the cooling rate is a function of the thickness of the tube and is, of course, slower for thicker cross-sections.

In order to prevent sagging of the plastic portion of the tube, it is preferable to support it as on one or more freely rotatable rolls 4, which, in the embodiment illustrated, are mounted on bearing members 4a secured to a frame 5.

In accordance with the present invention, collapse of the tube is prevented by a fluid medium which is maintained under the necessary pressure within the plastic portion of the tube. To this end, means may be provided for introducing a fluid, such as air, into the tube 3 under pressure as through a passageway 2b in a cross-head or bore-shaping portion 2a of the nozzle 2 (Fig. 4).

Cooling the tube to below its transition temperature so as to establish and set the tube 3 in a relatively rigid or shape-retaining condition, may be accelerated by passing the tube through a liquid cooling bath.

In the embodiment of the invention illustrated, the tube is passed through a tank 6 which is mounted on the frame 5 and supplied with a liquid coolant, such as water, through pipes 7. As shown in Fig. 3, the tube enters the tank through a sizing die 8 secured in one wall of the tank and thereafter passes through one or more additional sizing dies 8a and 8b secured within the tank and exits from a final sizing die 8c, in the opposite end of the tank.

It will be understood that where no change is desired in the configuration of the tube from its extruded shape, the sizing dies 8a and 8b may be eliminated and the dies 8 and 8c replaced by packing.

The overflow and leakage from the tank 6 is caught in a catch basin 9 forming part of the frame 5 and from the catch basin pumped back into the tank 6 through the pipes 7.

In order to draw the tubing through the sizing dies 8, 8a, 8b, and 8c in the tank 6, there is provided a pulling mechanism generally designated "P" which includes a series of cooperating pairs of pulling rolls 11a, 11b; 12a, 12b; and 13a, 13b. Each pair of rolls successively grips and draws the tubing 3 from the cooling bath.

The pulling mechanism "P" illustrated in the drawings is adapted to handle effectively a wide range of the tube sizes. To that end, the mechanism includes a frame or base 14 to which are secured a pair of upwardly extending vertical guide posts 15 and 16 on which a pair of bearing supports 17 and 18 are limited to vertical movement. The lower rolls 11b, 12b and 13b of each pair of pulling rolls are secured respectively to shafts 19, 20 and 21 which are rotatably journalled in the lower support 17. Similarly, the upper rolls 11a, 12a and 13a are secured respectively to shafts 22, 23 and 24, the bearings for which are supported by the upper support 18 in a manner which permits manual raising and lowering of the upper rolls into and out of pulling relationship with their cooperating lower rolls.

More particularly, the bearings for the shaft 22 are located in a bearing housing 25 pivotally supported at the ends of a pair of arms 25a, 25b, on a shaft 26 which is rotatably journalled in bearing-brack projections 18a and 18b of the support 18. The outer portion of the housing 25 in which the shaft 22 is journalled normally rests on the bearing support 18 so that the pulling roll 11a is located in proper relationship with its cooperating pulling roll 11b. A manually operable lever 27 which is secured in a bell crank portion 25c of the arm 25b provides means for pivotally raising the housing 25 from its position of rest on the bearing support 18 to thereby raise the pulling roll 11a.

The bearings for the shafts 23 and 24, similarly, are mounted for manual movement into and out of normal resting positions on the bearing support 18. More particularly, the shaft 23 for the pulling roll 12a is rotatably journalled in the outer end of a bearing housing 28 and the shaft 24 for the roll 13a is rotatably journalled in the outer end of a housing 29. The opposite end of the housing 29 is rigidly secured to the housing 28 which, as best seen in Fig. 2, includes arms 28a and 28b pivotally supported on the shaft 26. A lever 30 secured in a bell crank portion 28c of the arm 28a provides means for rotating the rigidly connected bearing members 28 and 29 about the shaft 26 to raise the housings for the pulling roll shafts 23 and 24 from their positions of rest on the bearing support 18.

As shown in Figs. 1 and 2, the arms 28a and 28b of the housing 28 curve upwardly over, and are spaced from, the housing 25. As a result, limited upward movement of the shaft 22 and the roll 11a secured thereto may be effected by means of the lever 27 before the housing 25 engages the arms 28a and 28b. Thereafter, the housing 25 supports the housing 28 and, consequently, further actuation of the lever 27 acts to raise all three upper pulling rolls 11a, 12a, and 13a upwardly from their normal positions of rest on the support 18.

Synchronous rotation of the several pulling rolls 11a, 11b; 12a, 12b; and 13a, 13b; is effected by an electrical motor "M" through a variable speedchanger 31 by means of which the peripheral speed of the rolls may be synchronized with the speed of extrusion of the tube 3. The drive from the speed changer 31 is through a sprocket and worming gear connection generally designated 32 which rotates a splined shaft 33 journalled in a bracket 34 secured to the frame 14. As illustrated in Figs. 1 and 2, the splined shaft 33 is disposed parallel to the guide posts 15 and 16 and extends through apertures in the supports 17 and 18.

The drive from the splined shaft 33 to the several shafts 19 through 24, inclusive, is unaffected by adjustment of the bearing supports 18 on the guide posts 15 and 16 or by the raising or lowering of the bearings for the upper shafts 22—24 by means of levers 27 and 30. Referring more in detail to the drive from the splined shaft 33 to the pulling rolls, the bearing support 17 includes bracket arms 17a and 17b between which a helical gear 35 is slidably mounted on the splined shaft 33. The helical gear 35 engages a mating helical gear 36 secured to a shaft 37 which is rotatably journalled in a bearing bracket portion 17b of the bearing support 17. Rotation of the shaft 37 effects rotation of the shafts 19, 20 and 21, and the lower pulling rolls 11b, 12b, and 13b mounted thereon, through respective chain and sprocket drives generally designated 39, 40 and 41 (Fig. 2).

The upper pulling rolls 11a, 12a and 13a are similarly driven. More particularly, splined shaft 33 carries a helical gear 42 which rests on the upper bearing member 18 and cooperatively engages helical gear 43 secured to the shaft 26. Rotation of the upper shafts 22, 23 and 24 and the upper pulling rolls 11a, 12a and 13a, respectively secured thereto is effected by the shaft 26 through chain and sprocket drives generally designated 44, 45 and 46, respectively.

It will be seen from inspection of Fig. 2 that the drives 44, 45 and 46 permit manual raising and lowering of the bearing supports for the upper pulleys by means of the levers 27 and 30, and likewise, permit raising or lowering of the bearing support 18 without interrupting the drives for the upper pulling rolls.

The pulling mechanism "P" includes means for simultaneously adjusting the distance between each pair of pulling rolls so that the pulling mechanism is adapted to accommodate a wide range of tube sizes. More particularly, there is provided for this purpose a pair of vertically disposed screws 47, and 48 which have opposite threads from their centers to their ends. The lower ends of the screws have opposite threads and are rotatably journalled in the frame 14. Rotation of the screws 47 and 48 is effected through a rotatably mounted horizontal shaft 49 to the ends of which are secured bevel gears 50a and 51a which engage like bevel gears 50 and 51 secured to the shafts 47 and 48. Rotation of the shaft 49 may be manually effected as by means of a handwheel 52 through a worm and gear arrangement generally designated 52a. Each of the threaded shafts 47 and 48 extend through and engage each of the bearing supports 17 and 18 so as to separate the bearing supports 17 and 18 when the handwheel 52 is rotated in one direction and to draw the members together when rotation is effected in the opposite direction.

In accordance with this invention, the bore of the tube is closed by an air tight seal which automatically retains its desired position in the tube and exerts the necessary back pressure on the pressure medium introduced into the tube through the crosshead 2a to prevent collapse. In order to provide the seal in the embodiment illustrated, the tube 3 after leaving the pulling roll mechanism "P" is fed upwardly over a roller 54 which is freely, rotatably supported in a frame 53. The tube thereafter passes downwardly under spaced rollers 55 and 56 which are located at successively lower points; then upwardly over a roller 57 reversing the curvature of the tube; and finally under one or more rolls 58 which again reverse the curvature of the tube after which the flexing or bending stresses exerted on the tube by the rollers 54 to 58 are relieved. Preferably the rollers 58 are located so that when the tube is relieved of the externally exerted bending stresses, the unstressed portion of the tube is generally in alignment with the portion between the pulling rolls 11a, 11b and the extrusion nozzle 2.

As shown in Fig. 1, the rollers 54 to 58 together with the pulling rolls of the mechanism "P" establish a U-bend T' in the tube. It will be appreciated that the cooperation between the several pairs of pulling rolls of the pulling mechanism and the stressing rollers 54 through 58 may be maintained by at least one pair of pulling rolls while disengaging another pair from the tube. Thus, when rolls 11a and 11b or rolls 12a, 12b; 13a and 13b are disengaged by manual actuation of levers 27 or 30, respectively, the engaged pair or pairs continue to maintain, with the rollers 54 to 58, the proper bend in the tube, and, in addition, continue to draw the tube through the cooling tank 6.

Care must be taken in locating the several rollers 54 to 58 so as not to overstress the tube beyond the fracture or yield point of the material, such as polystyrene, of which it is formed. Stresses below the yield point are sufficient to flex the tube and form the U-bent T'. Inasmuch as the stressed portion of the tube is at a temperature below its transition point, no permanent distortion of the tube is effected and subsequent relief of the externally applied stresses is sufficient to eliminate the curve and the tube returns to the shape established when the material passes downwardly through the transition temperature during the cooling operation.

The dam or pressure block is formed in the tube by a liquid which is poured into the open end of the tube and settles in the U-bent portion T' of the tube. The liquid employed for this purpose is preferably one which is non-reactive and immiscible with the tube and with the pressure exerting fluid medium introduced into the tube at the nozzle to prevent collapse prior to cooling. The liquid also must be of sufficient specific gravity to permit a differential in the heights of the two columns 60 and 61, which it forms in the legs of the U-bent portion T' of the tube, sufficient to provide the necessary back pressure to dam the pressure exerting medium. Normally only fractional inches of water are necessary for this purpose and generally that material is satisfactory for the purpose. However, where greater back pressure is desired, materials of higher specific gravity, as for example, mercury, may be employed.

The bore seal thus provided is leak proof within the limits permitted by the depth of the U-bend T' and the specific gravity of the sealing liquid used. Furthermore, the seal is self-locating at the desired point in the tube. It is only necessary to control the inlet pressure in order to maintain the necessary internal pressure to prevent collapse or to blow the tubing continually to a desired size.

Having thus described my invention, I claim:

1. The method of fabricating thermoplastic material which comprises continuously extruding the material in a heated plastic condition from an extrusion nozzle in the form of tubing, cooling and establishing successive portions of the tubing in a non-plastic shape-sustaining condition, stressing successive portions of the non-plastic tubing so as continually to maintain a U-bend therein, continuously gripping and pulling the non-plastic portion of the tubing to feed the tubing through said location, locating a liquid in the U-bent portion of the tubing, maintaining a fluid, immiscible with said liquid, under pressure in the portion of the tubing between said liquid and the nozzle so that the liquid level is different in the legs of the U-bend, and releasing said stresses in a portion of the tube away from the U-bend and the nozzle.

2. Apparatus for forming tubing of thermoplastic material including a nozzle, an extruder for continuously forcing the material in a heated, plastic condition through the nozzle in the form of tubing, means for cooling and setting said tubing in a non-plastic shape-sustaining condition, means for introducing a fluid under pressure into said tubing to prevent collapse of the tubing, a pair of pulling rolls for gripping and drawing the set tubing away from the die, means downstream of and cooperating with the pulling rolls for stressing successive portions of the tubing so as to form and maintain a U-bend therein, and a liquid dam located in said U-bend to form an air-tight seal for the pressure medium.

3. Apparatus for forming tubing of thermoplastic material including a nozzle, an extruder for continuously forcing the material in a plastic condition through the nozzle in the form of tubing, means for introducing a fluid under pressure into said tubing to prevent collapse of the tubing, means for setting successive portions of the tubing in a shape-retaining condition, successive pairs of pulling rolls engageable with the set tubing to draw the tubing from the nozzle, means for simultaneously adjusting the distance between each pair of pulling rolls to accommodate various sizes of tubing, means for disengaging one pair of pulling rolls from the tubing independently of another pair, means cooperating with at least one pair of pulling rolls for stressing successive portions of the tubing downstream of said pulling rolls so as to form and maintain a U-bend therein, and a liquid dam inert to said tubing and said pressure fluid located in said U-bend to form an air-tight seal for the pressure medium.

4. Apparatus for forming tubing of thermoplastic material including a nozzle, an extruder for continuously forcing the material in a heated, plastic condition through the nozzle in the form of tubing, means in said nozzle for introducing a fluid under pressure into said tubing to prevent collapse of the tubing, a cooling bath for lowering the temperature and establishing the tubing in a shape-retaining condition, a die for sizing the external shape of the tubing, a plurality of pairs of synchronously driven pulling rolls for drawing the tubing through said die and cooling bath, means for simultaneously adjusting the distance between each pair of pulling rolls to accommodate various sizes of tubing, means for disengaging one pair of pulling rolls from the tubing independently of another pair, means cooperating with at least one pair of said pulling rolls for stressing successive portions of the tubing to form and maintain a U-bend therein downstream of the pulling rolls, and a liquid dam inert to said tubing and said pressure fluid located in said U-bend to form an air-tight seal for the pressure medium, said dam exerting a non-deforming sealing pressure on said tubing.

JAMES BAILEY.

REFERENCES CITED

The following references are of record in the file of this patent:

UNITED STATES PATENTS

| Number | Name | Date |
|---|---|---|
| 1,196,648 | Bleecker | Aug. 29, 1916 |
| 1,544,255 | Maynard | June 30, 1925 |
| 2,337,927 | Reichel et al. | Dec. 28, 1943 |
| 2,377,908 | Slaughter | June 12, 1945 |
| 2,433,937 | Tornberg | Jan. 6, 1948 |
| 2,491,589 | Slaughter | Dec. 20, 1949 |
| 2,519,375 | Jargstorff et al. | Aug. 22, 1950 |

FOREIGN PATENTS

| Number | Country | Date |
|---|---|---|
| 3,999 | Great Britain | A. D. 1891 |